UNITED STATES PATENT OFFICE.

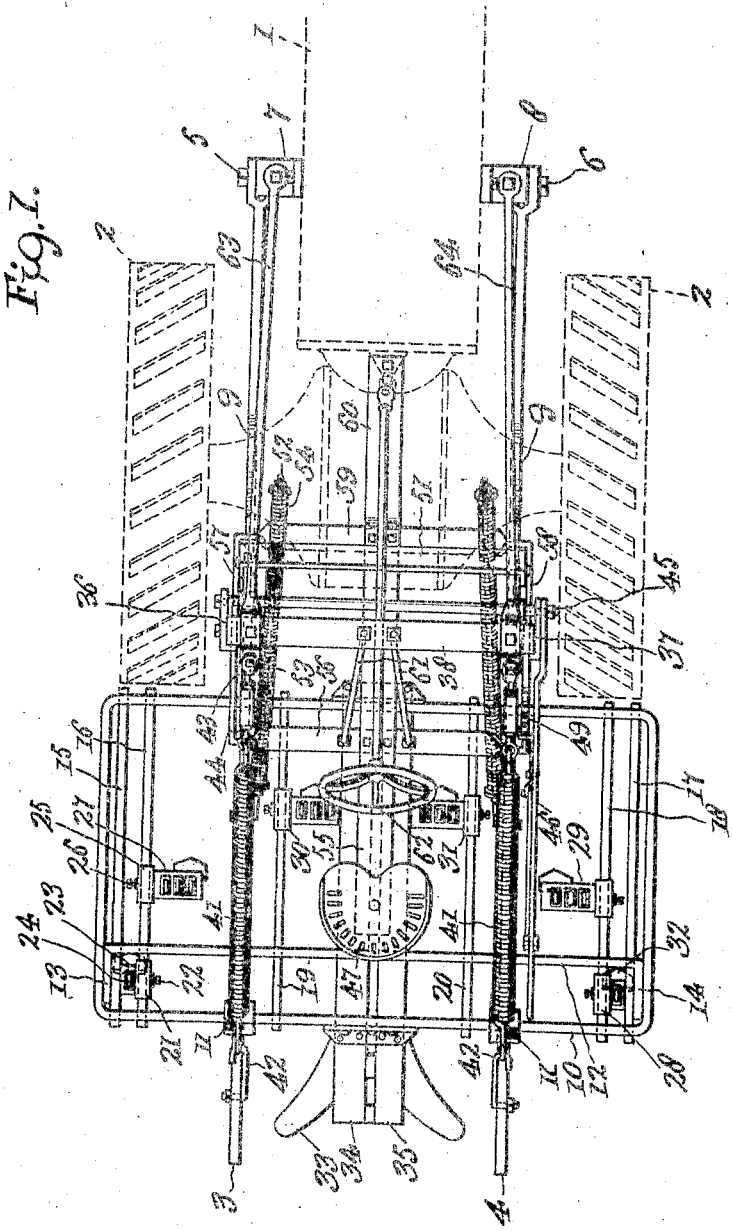

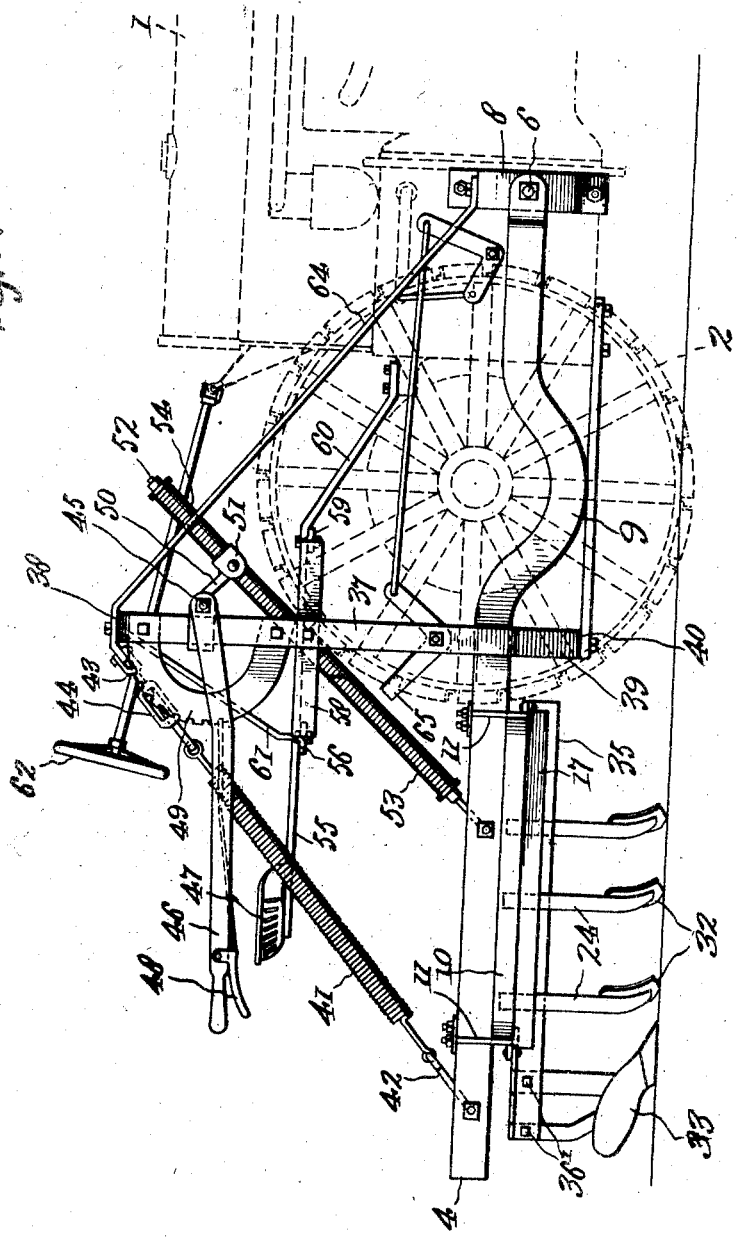

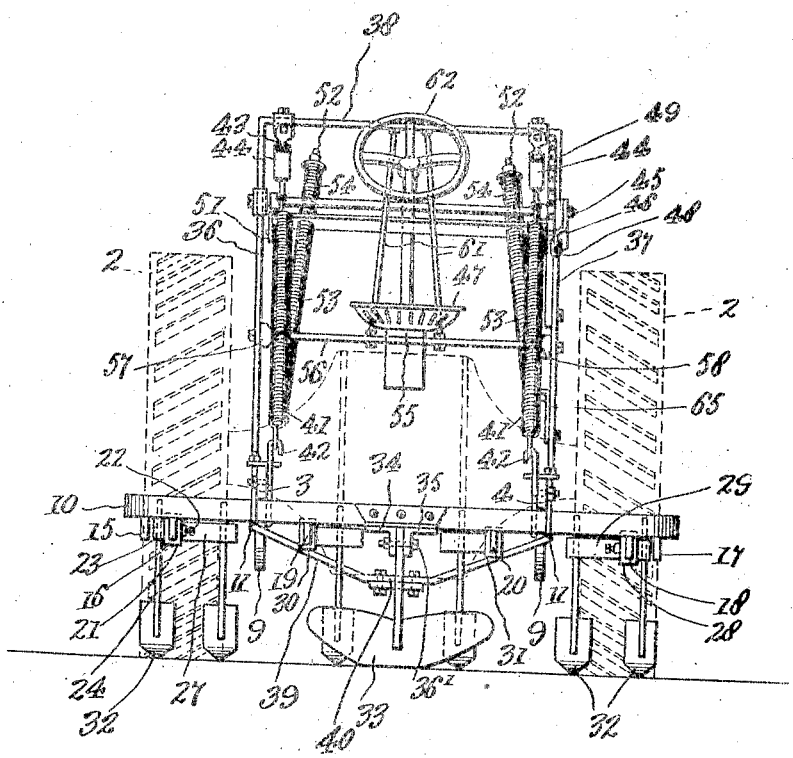

LOUIS M. DILL, OF AVOCA, LOUISIANA.

IMPLEMENT-HOLDER.

1,372,611. Specification of Letters Patent. Patented Mar. 22, 1921.

Application filed August 10, 1920. Serial No. 402,511.

*To all whom it may concern:*

Be it known that I, LOUIS M. DILL, a citizen of the United States, residing at Avoca, in the parish of Assumption and State of Louisiana, have invented certain new and useful Improvements in Implement-Holders; and I do hereby declare the following to be a full, clear, and exact description of the invention, such as will enable others skilled in the art to which it appertains to make and use the same.

The present invention relates to improvements in implement holders, and has for an object to provide an improved holder for various implements, more particularly agricultural or excavating implements which will be found to be especially useful in connection with tractors.

Another object of the invention resides in providing a convenient and compact implement holder which enables the implements to be readily and quickly attached and detached from the holder, so that implements of one kind may be substituted for those of another to meet the requirements of various characters of work.

A further object of the invention resides in providing an improved device of this character in which the driver of the tractor will have convenient control over the implements from a point near the driver's seat.

A still further object of the invention resides in providing an improved device of this character which will maintain the implements at a uniform depth irrespective of whether the wheel of the tractor may be on an elevation or in a hollow.

A still further object of the invention lies in providing a tractor with an attachment of this character in which the tractor may be turned in a minimum amount of space and which dispenses with an attaching wheel for the implements.

It is a still further object of the invention to provide an attachment of the above character which may be coupled to any tractor or other locomotive power plant, and which may permit any number of implements to be attached at the same time.

In the accompanying drawings forming a part of this application, and in which similar reference symbols indicate corresponding parts in the several views:

Figure 1 is a plan view of an implement holder constructed according to the present invention, and shown as applied to a tractor indicated in dotted lines.

Fig. 2 is a side view of the same; and

Fig. 3 is a rear view.

Referring more particularly to the drawings, 1 designates the engine block of a tractor which is provided with the traction wheels 2.

According to the invention a pair of beams 3 and 4 are pivoted as at 5 and 6 to the motor block, or rather to brackets 7 and 8, respectively, bolted or otherwise secured to said motor block 1. The beams 3 and 4 are provided with depressed or offset portions 9 in order to fit well beneath the rear axle of the tractor. To the beams 3 and 4 is connected a rectangular frame 10 preferably made of metal and being secured beneath said beams as by the U-bolts 11, although other means may be employed for this purpose.

The frame 10 is provided with a brace 12 having its ends 13 and 14 turned rearwardly and against the sides of the rectangular frame where such ends may be bolted, brazed, or otherwise secured. Beneath the rectangular frame 10, and extending parallel with the beams 3 and 4, are pairs of lateral rails 15, 16 and 17, 18. In like manner other rails 19 and 20 are provided on the frame 10 inwardly of the rails 16 and 18, and lying adjacent the longitudinal center of the appliance.

These rails may be provided in any suitable number and may be spaced at any suitable distance apart. The rail 16 carries a sleeve 21 secured in any adjusted position by a screw 22 and having a socket 23 in which to receive the shank 24 of a shovel. Similarly a sleeve 25 is held on the rod 16 in any position of adjustment by set screw 26. A triple socket 27, extending from the sleeve 25 is provided for the receiving of the shank of a shovel, plow, or other agricultural or excavating implement. The three sockets are provided for the adjustment of the implement so as to vary the spacing or distance between the rows.

Similar implement holders 28 and 29 are provided on the rail 18, and the rails 19 and 20 are also equipped with implement holders 30 and 31 preferably of the triple character, although it will be understood that these various implement holders may be enlarged and may be of the single, triple, or other variety, to hold tools of varying characters for different conditions of work.

The plows or shovels are indicated at 32 in Figs. 2 and 3. A main plow 33 is also provided centrally of the frame 10, it being supported on a pair of angle irons 34 and 35 to which it is secured as by bolts 36. Angle irons are carried by the under side of the frame 10 as by U-bolts or in any other suitable manner.

Standards 36 and 37 are erected upon the tractor just in rear of the depressed or offset portions 9, these standards being also formed of suitable metal which is bent to provide a bridge piece 38 connecting the upper ends of the standards 36 and 37. Also at the lower ends of the standards a base connecting piece 39 is provided, being preferably depressed centrally, as indicated at 40.

Springs 41 are connected between the rear ends of the beams 3 and 4 and the bridge piece 38 by suitable links 42 and 43, the latter of which preferably include turn buckles 44. These springs are equalizing springs or counterbalances which assist the operator to adjust the beams 3 and 4. The standards 36 and 37 provide suitable supports in which to journal a rock shaft 45 moved by a lever 46 placed convenient to the hand of the operator occupying the seat 47. A latch device 48 is provided in conjunction with the lever 46 and coöperates with a toothed segment 49 also carried by the post 37.

The rock shaft carries a pair of arms 50, being coupled to sleeves 51 fitted to reciprocate on rods 52. Coiled springs 53 and 54 are wound on the rods 52 and are normally under compression at opposite sides of the sleeves 51. The seat 47 is carried by a spring 55, or other suitable support, which is bolted or otherwise secured to a rear horizontal flat cross piece 56 forming part of a frame having side pieces 57 and 58 which are flat in a horizontal direction. This frame also includes a front piece 59 which also extends in a flatwise horizontal direction and which provides a suitable part to which to secure the brace 60 which is supported from the tractor. Braces 61 extend from the rear cross piece 56 to the bridge piece 38. The steering wheel is indicated at 62 and is extended back to the seat 47 so that it may be operated conveniently therefrom. Braces 63 and 64 also extend forwardly from the opposite end of the bridge piece 38 to the brackets 7 and 8, to which the beams 3 and 4 are pivoted.

The operation is as follows:

The tractor moves along under its own power in the usual manner, being steered by the operation of the wheel 62 by the driver occupying the seat 47. In going to and from the field it is desirable to have the plows 32 and 33, or other implements, out of contact with the soil and held aloft. For this purpose the operator may have resort to the lever 46 by depressing which he will cause the rock shaft 45 to swing in a counterclockwise direction, elevating the arms 50 and consequently the sleeves 51. He will by so doing lift the rods 52 through the yielding action of the springs 54, thus causing the beams 3 and 4, together with the plows, to be raised about the pivot points 5 and 6. The latch 48 will hold the parts in this elevated position until it becomes desirable to again lower the plows into contact with the earth.

The counterbalance springs 41 will assist the operator in the action of lifting the heavy plow frame which would otherwise be exceedingly difficult. The springs 53 act to place a suitable degree of resilient tension upon the plows to cause them to bear with sufficient resistance into the soil and allowing them to yield when obstructions are met.

The various implement holders on the frame 10 provide for receiving shovels, plows, or other implements of an agricultural or excavating kind, and by the adjustment of the various set screws of the holders the implement may be made to assume various different positions.

The implement holder is peculiarly adaptable to tractors, and it involves no alteration in the construction thereof but may be applied to any standard tractor by bolting or otherwise securing the brackets 7 and 8 thereon. The clutch control of the tractor is also extended, as indicated at 65, in order to be at the proper position for the operator's foot.

The improved implement holder may be used for cultivating either by straddling the row of plants or by moving between the rows, as desired.

It is obvious that those skilled in the art may vary the details of construction and arrangements of parts without departing from the spirit of my invention, and therefore I do not wish to be limited to such features except as may be required by the claims.

I claim:

1. In combination with a vehicle, a pair of beams having their forward ends pivotally connected to the vehicle, a substantially triangular and open frame supported by the rear ends of the beams projecting beyond the vehicle, pairs of rails extending across said frame, sleeves slidable on said rails and provided with sockets, means whereby said sleeves may be clamped to the rails, tools having shanks removably fitted in said sockets, standards supported by said vehicle and rising to the opposite sides of the intermediate portion of said beams, a bridge piece connecting the upper ends of said standards, a base piece connecting the lower ends of the same, resilient counterbalance means connected between said bridge piece and the ends of said beams, a rock shaft journaled in said standards, means for actuating said rock shaft and for securing the same in adjusted position, arms extending forwardly from said rock shaft, collars carried by said frames, rods sliding through said collars having their lower ends connected to said beams and their upper ends projecting beyond the collars, coil springs wound about said rods and bearing at opposite sides against said collars, a seat supported above said frame, and extension means projecting from the vehicle in proximity to said seat for controlling the vehicle from the seat, substantially as described.

2. In combination with a vehicle, brackets carried at the sides thereof near its ends, a pair of elongated beams pivoted at their front ends to said brackets and extending to a considerable distance beyond the rear of the vehicle, a rectangular open frame lying across said beams at their rear ends, means for removably clamping the frame to said beams, said frame extending beyond the sides of the beams, a brace extending transversely across the rear portion of said frame, longitudinally running rails carried by said frame at both sides of the beams and extending parallel with such beams, sleeves slidable on said rails and having means for clamping the same in adjusted position, said sleeves provided with a plurality of sockets, tools having shanks selectively fitted in the plurality of sockets, standards carried by the vehicle and extending upwardly at the intermediate portions of said beams, a bridge piece connecting the upper ends of the standards, resilient adjustable counterbalance means connected between said bridge piece and the rear ends of the beams, a rock shaft carried by said beams, and resilient means connecting with the beams and adjustable by said rock shaft, substantially as described.

3. In combination with a vehicle, a pair of beams pivoted at their forward ends to the vehicle and extending beyond the rear thereof, a rectangular open frame extending transversely across said beams at the rear of the vehicle, means for removably clamping said frame to the beams, a brace extending transversely across said frame and near its rear end, pairs of parallel rails extending longitudinally of the vehicle and connected between the forward and rear portions of said frame, tool holders slidably and adjustably carried by said rails, standards carried by said vehicle and extending upwardly at the intermediate portions of said beams, a bridge piece connecting the upper ends of said standards, a base piece connecting the lower ends thereof, a rock shaft journaled on said standards, arms projecting from said rock shaft, collars carried by said arms, rods extending loosely through said collars, coil springs wound on said rods at opposite sides of said collars, said rods being coupled at their lower ends to the beams, means for turning said rock shaft and for holding it in adjusted position, and adjustable resilient counterbalance means connected between the bridge piece and the rear ends of said beams, substantially as described.

LOUIS M. DILL.